United States Patent
Kaneyasu et al.

(10) Patent No.: US 9,600,107 B2
(45) Date of Patent: Mar. 21, 2017

(54) TOUCH PANEL INCLUDING A TOUCH SENSOR

(71) Applicant: Semiconductor Energy Laboratory Co., Ltd., Kanagawa-ken (JP)

(72) Inventors: Makoto Kaneyasu, Kanagawa (JP); Kazunori Watanabe, Kanagawa (JP); Hiroyuki Miyake, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 14/644,814

(22) Filed: Mar. 11, 2015

(65) Prior Publication Data
US 2015/0261333 A1 Sep. 17, 2015

(30) Foreign Application Priority Data
Mar. 13, 2014 (JP) .................................. 2014-050690

(51) Int. Cl.
*G06F 3/041* (2006.01)

(52) U.S. Cl.
CPC ............ *G06F 3/041* (2013.01); *G06F 3/0412* (2013.01); *G06F 2203/04102* (2013.01)

(58) Field of Classification Search
CPC ........ G06F 3/041; G06F 3/0412; G06F 3/044; G06F 2203/04102; G06F 2203/04107; G09G 3/30–3/3291; G09G 2300/0439
See application file for complete search history.

(56) References Cited

U.S. PATENT DOCUMENTS

| | | |
|---|---|---|
| 8,243,027 B2 | 8/2012 | Hotelling et al. |
| 8,367,440 B2 | 2/2013 | Takayama et al. |
| 8,415,208 B2 | 4/2013 | Takayama et al. |
| 2005/0200292 A1 | 9/2005 | Naugler, Jr. et al. |
| 2006/0097991 A1 | 5/2006 | Hotelling et al. |
| 2009/0046077 A1 | 2/2009 | Tanaka et al. |
| 2009/0085891 A1 | 4/2009 | Yang et al. |
| 2010/0163874 A1 | 7/2010 | Koyama et al. |
| 2011/0273397 A1* | 11/2011 | Hanari ................... G06F 3/0412 345/174 |
| 2011/0316809 A1* | 12/2011 | Kim ......................... G06F 3/044 345/174 |
| 2012/0044202 A1* | 2/2012 | Ishizaki ................ G06F 3/0412 345/174 |
| 2012/0062508 A1* | 3/2012 | Liu .......................... G06F 3/044 345/174 |

(Continued)

FOREIGN PATENT DOCUMENTS

| | | |
|---|---|---|
| JP | 2003-174153 A | 6/2003 |
| JP | 2003-196023 A | 7/2003 |
| JP | 2009-003916 A | 1/2009 |

*Primary Examiner* — Nathan Danielsen
(74) *Attorney, Agent, or Firm* — Husch Blackwell LLP

(57) ABSTRACT

To provide a touch panel in which a decrease in display quality is suppressed. The touch panel includes a touch sensor and a display element. The touch sensor includes a transistor and a sensor element. The transistor is electrically connected to the sensor element. The sensor element includes a pair of electrodes and a dielectric layer. The dielectric layer is positioned between the pair of electrodes. One of the pair of electrodes is an island-shaped electrode. The display element can display an image toward the touch sensor side. The island-shaped electrode does not overlap with a display region of the display element.

18 Claims, 6 Drawing Sheets

(56) References Cited

U.S. PATENT DOCUMENTS

| | | | |
|---|---|---|---|
| 2013/0044074 A1* | 2/2013 | Park | G06F 3/0412 345/174 |
| 2013/0127917 A1* | 5/2013 | Kwack | G06F 1/1652 345/660 |
| 2013/0214324 A1 | 8/2013 | Takayama et al. | |
| 2014/0063368 A1 | 3/2014 | Yamazaki et al. | |
| 2014/0118299 A1* | 5/2014 | Wang | G06F 3/0412 345/174 |
| 2014/0353691 A1* | 12/2014 | Lee | G06F 3/044 257/88 |
| 2014/0357019 A1 | 12/2014 | Koyama et al. | |
| 2015/0025518 A1 | 1/2015 | Kobayashi et al. | |
| 2015/0144920 A1 | 5/2015 | Yamazaki et al. | |

\* cited by examiner

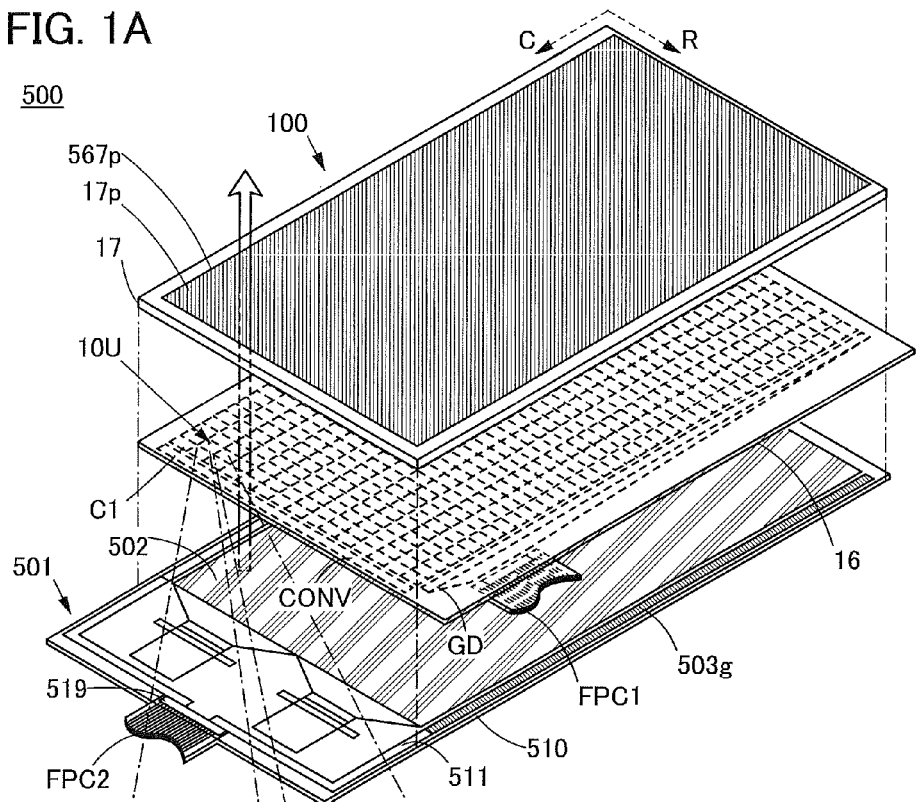
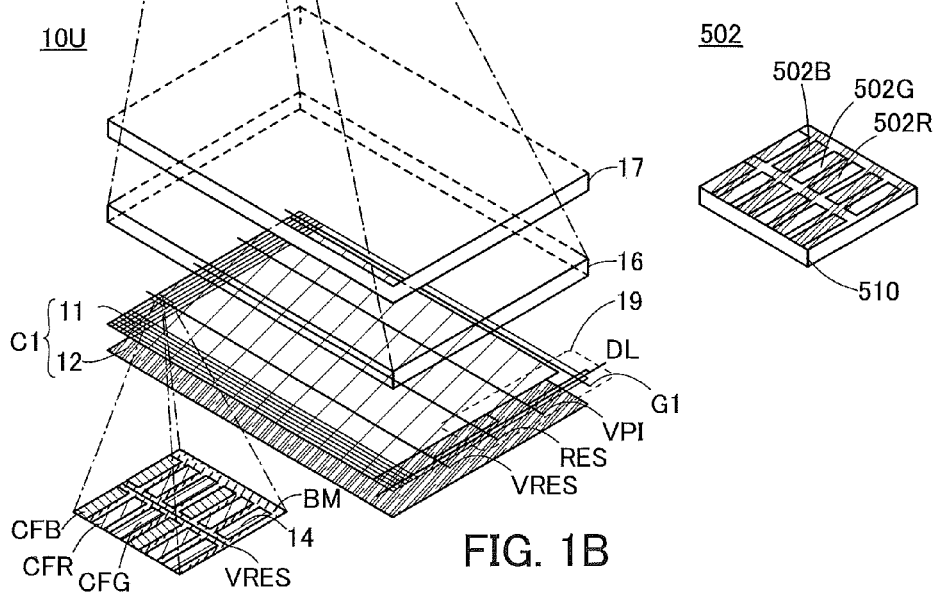

FIG. 2A
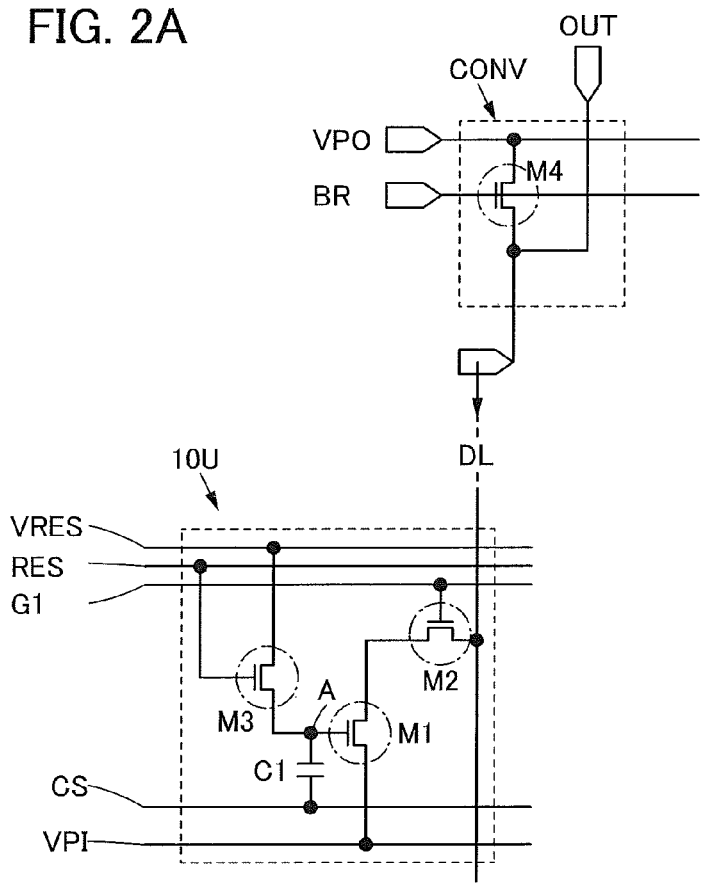
FIG. 2B1
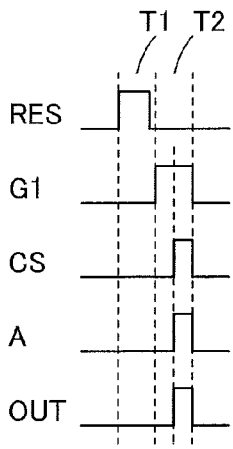
FIG. 2B2
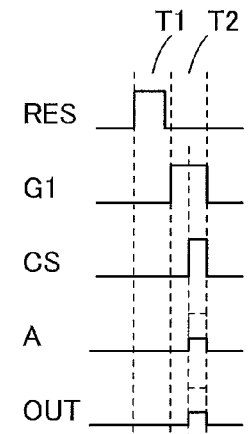
FIG. 2C
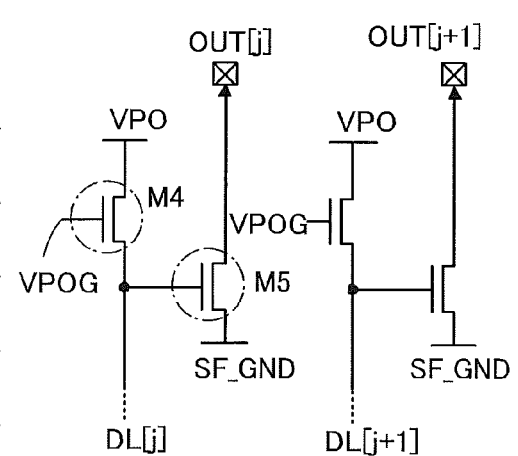

TOUCH PANEL INCLUDING A TOUCH SENSOR

BACKGROUND OF THE INVENTION

1. Field of the Invention

One embodiment of the present invention relates to a touch sensor, particularly to a touch sensor having flexibility. One embodiment of the present invention relates to a touch panel, particularly to a touch panel having flexibility.

Note that one embodiment of the present invention is not limited to the above technical field. One embodiment of the invention disclosed in this specification and the like relates to an object, a method, or a manufacturing method. One embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a storage device, an electronic device, a lighting device, a method for driving any of them, and a method for manufacturing any of them.

In this specification and the like, a semiconductor device generally means a device that can function by utilizing semiconductor characteristics. A semiconductor element such as a transistor, a semiconductor circuit, an arithmetic device, and a memory device are each an embodiment of a semiconductor device. An imaging device, a display device, a liquid crystal display device, a light-emitting device, an electro-optical device, a power generation device (including a thin film solar cell, an organic thin film solar cell, and the like), and an electronic device may each include a semiconductor device.

2. Description of the Related Art

A flexible device in which a functional element such as a semiconductor element, a display element, or a light-emitting element is provided over a substrate having flexibility (hereinafter also referred to as a flexible substrate) has been developed. Typical examples of the flexible device include, as well as a lighting device and an image display device, a variety of semiconductor circuits including a semiconductor element such as a transistor.

Patent Document 1 discloses a flexible active matrix light-emitting device in which an organic electroluminescence (EL) element and a transistor serving as a switching element are provided over a film substrate.

Display devices are expected to be applied to a variety of uses and become diversified. For example, a smartphone and a tablet terminal with a touch panel are being developed as portable information appliances.

REFERENCE

Patent Document

[Patent Document 1] Japanese Published Patent Application No. 2003-174153

SUMMARY OF THE INVENTION

What is desirable is a flexible touch panel in which a display panel having flexibility is provided with a function of inputting data with a finger or the like touching a screen as a user interface.

One object of one embodiment of the present invention is to provide a touch sensor having flexibility or a touch panel having flexibility. Another object of one embodiment of the present invention is to provide a lightweight touch panel. Another object of one embodiment of the present invention is to provide a touch panel having a small thickness. Another object of one embodiment of the present invention is to provide a touch panel with high detection sensitivity. Another object of one embodiment of the present invention is to achieve both thickness reduction and high detection sensitivity of a touch sensor or a touch panel. Another object of one embodiment of the present invention is to provide a touch sensor that can be used in a large-sized touch panel. Another object of one embodiment of the present invention is to provide a large-sized touch panel.

Another object of one embodiment of the present invention is to provide a manufacturing method of a touch sensor that has a small number of steps.

Another object of one embodiment of the present invention is to provide a touch panel in which reduction in display quality is suppressed. Another object of one embodiment of the present invention is to provide a touch panel with high reliability. Another object of one embodiment of the present invention is to provide a touch panel with high resistance to repeated bending. Another object of one embodiment of the present invention is to provide a novel semiconductor device, a novel light-emitting device, a novel display device, a novel touch sensor, a novel touch panel, a novel electronic device, or a novel lighting device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is an active matrix touch sensor including a transistor and a sensor element. The transistor and the sensor element are electrically connected to each other.

One embodiment of the present invention is a touch panel including a touch sensor and a display element. The touch sensor includes a transistor and a sensor element. The transistor is electrically connected to the sensor element. The sensor element includes a pair of electrodes and a dielectric layer. The dielectric layer is positioned between the pair of electrodes. One of the pair of electrodes is an island-shaped electrode. The display element can display an image toward the touch sensor side. The island-shaped electrode does not overlap with a display region of the display element.

It is preferable that the touch panel having any of the above structures have flexibility.

In any of the above structures, it is preferable that the touch panel further include a light-blocking layer, the light-blocking layer be positioned between the touch sensor and the display element, and the light-blocking layer have a portion overlapping with the transistor included in the touch sensor. In addition, the light-blocking layer preferably has a portion overlapping with the island-shaped electrode.

Another embodiment of the present invention is a touch panel including a touch sensor, a display element, and an insulating film. The touch sensor includes a transistor and a sensor element. The transistor is electrically connected to the sensor element. The sensor element includes a pair of electrodes and a dielectric layer. The dielectric layer is positioned between the pair of electrodes. One of the pair of electrodes is an island-shaped electrode. The display element can display an image toward the touch sensor side. The display element includes a first electrode, a second electrode, and a layer including a light-emitting organic compound. The layer including a light-emitting organic compound is positioned between the first electrode and the second electrode. The insulating film covers an end portion of the first electrode and includes a portion overlapping with the transistor included in the touch sensor. An opening portion of the island-shaped electrode overlaps with an opening portion of the insulating film.

Note that the light-emitting device in this specification includes, in its category, a display device using a light-emitting element. In some cases, a light-emitting device is included in a module in which a light-emitting element is provided with a connector such as an anisotropic conductive film or a tape carrier package (TCP); a module in which a printed wiring board is provided at the end of a TCP; and a module in which an integrated circuit (IC) is directly mounted on a light-emitting element by a chip on glass (COG) method. A light-emitting device may be included in lighting equipment or the like.

One embodiment of the present invention can provide a touch sensor having flexibility or a touch panel having flexibility. Another embodiment of the present invention can provide a lightweight touch sensor or a lightweight touch panel. Another embodiment of the present invention can provide a touch sensor or a touch panel having a small thickness. Another embodiment of the present invention can provide a touch sensor or a touch panel with high detection sensitivity. Another embodiment of the present invention can achieve both thickness reduction and high detection sensitivity of a touch sensor or a touch panel. Another embodiment of the present invention can provide a touch sensor that can be used in a large-sized touch panel. Another embodiment of the present invention can provide a large-sized touch panel.

Another embodiment of the present invention can provide a manufacturing method of a touch sensor that has a small number of steps.

Another embodiment of the present invention can provide a touch panel in which reduction in display quality is suppressed. One embodiment of the present invention can provide a touch panel with high reliability. One embodiment of the present invention can provide a touch panel with high resistance to repeated bending. One embodiment of the present invention can provide a novel semiconductor device, a novel light-emitting device, a novel display device, a novel touch sensor, a novel touch panel, a novel electronic device, or a novel lighting device.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

In the accompanying drawings:

FIGS. 1A to 1C illustrate an example of a touch panel;

FIGS. 2A, 2B1, 2B2, and 2C illustrate examples of configurations and driving methods of a sensor circuit and a converter;

DETAILED DESCRIPTION OF THE INVENTION

Figure 3A:
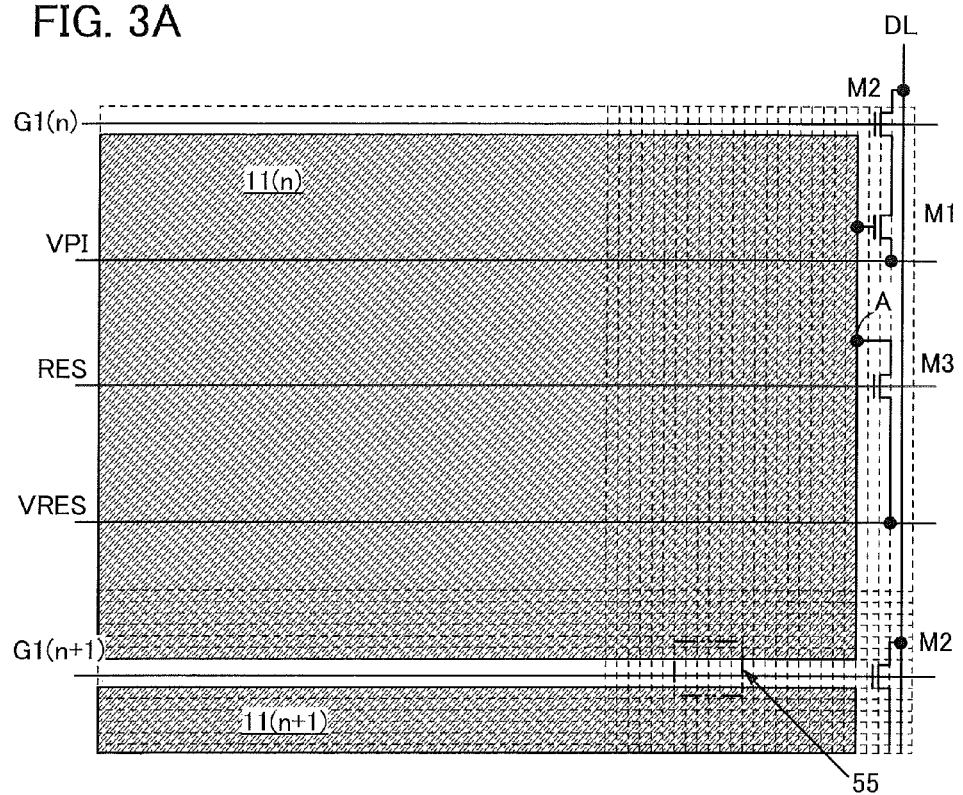
FIGS. 3A to 3C illustrate examples of a touch panel.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below.

Note that in the structures of the invention described below, the same portions or portions having similar functions are denoted by the same reference numerals in different drawings, and description of such portions is not repeated. Further, the same hatching pattern is applied to portions having similar functions, and the portions are not especially denoted by reference numerals in some cases.

In addition, the position, size, range, or the like of each structure illustrated in drawings and the like is not accurately represented in some cases for easy understanding. Therefore, the disclosed invention is not necessarily limited to the position, the size, the range, or the like disclosed in the drawings and the like.

Note that in this specification, ordinal numbers such as "first", "second", and "third" are used in order to avoid confusion among components, and the terms do not limit the components numerically.

Note that in this specification, terms for describing arrangement, such as "over" "above", "under", and "below", are used for convenience in describing a positional relation between components with reference to drawings. Further, the positional relation between components is changed as appropriate in accordance with a direction in which each component is described. Thus, there is no limitation on terms used in this specification, and description can be made appropriately depending on the situation.

In this specification and the like, a transistor is an element having at least three terminals of a gate, a drain, and a source. The transistor includes a channel region between the drain (a drain terminal, a drain region, or a drain electrode) and the source (a source terminal, a source region, or a source electrode) and current can flow through the drain, the channel region, and the source. Note that in this specification and the like, a channel region refers to a region through which current mainly flows.

Further, functions of a source and a drain might be switched when transistors having different polarities are employed or a direction of current flow is changed in circuit operation, for example. Therefore, the terms "source" and "drain" can be switched in this specification and the like.

Note that in this specification and the like, the expression "electrically connected" includes the case where components are connected through an "object having any electric function". There is no particular limitation on an "object having any electric function" as long as electric signals can be transmitted and received between components that are connected through the object. Examples of an "object having any electric function" are a switching element such as a transistor, a resistor, an inductor, a capacitor, and elements with a variety of functions as well as an electrode and a wiring.

(Embodiment 1)

In this embodiment, a touch panel of one embodiment of the present invention is described.

The touch panel of one embodiment of the present invention includes an active matrix touch sensor and a display element between a pair of substrates. The touch sensor is a capacitive type touch sensor, for example.

In a touch panel including a sensor portion and a display portion that overlap with each other, a parasitic capacitance is formed in some cases between a wiring or an electrode included in a capacitive type touch sensor and a wiring or an electrode included in the display portion. The parasitic capacitance might reduce the change in capacitance at the time when a finger or the like gets closer, and the detection sensitivity of the touch sensor might decrease. Furthermore, noise caused by operating the display element travels to the touch sensor side through the parasitic capacitance and the detection sensitivity of the touch sensor might decrease.

By sufficiently increasing the distance between the sensor portion and the display portion, the adverse effect of the parasitic capacitance and the noise can be avoided and the decrease in the detection sensitivity of the touch sensor can be suppressed; however, the thickness of the whole touch panel is increased in some cases.

In one embodiment of the present invention, an active matrix touch sensor is provided. The touch sensor includes a transistor and a sensor element. The transistor and the sensor element are electrically connected to each other.

Specifically, one embodiment of the present invention is a touch sensor including a transistor and a sensor element. In the touch sensor, the transistor and the sensor element are electrically connected to each other, the sensor element includes a pair of electrodes and a dielectric layer, and the dielectric layer is located between the pair of electrodes.

It is preferable that the conductive layer of the transistor and the electrode of the sensor element be formed in the same step because the touch sensor can be manufactured in a small number of steps. Thus, the number of steps of manufacturing the touch panel can be reduced and the cost of manufacturing the touch panel can be reduced.

Examples of a layer that is formed in the same step as that of the electrode of the sensor element are a gate electrode, a source electrode, and a drain electrode of the transistor, and a wiring.

In the active matrix touch sensor of one embodiment of the present invention, an electrode of a sensor element and a read wiring can be formed in different layers. When the read wiring has a narrow width, a parasitic capacitance can be small. Accordingly, a decrease in the detection sensitivity of the touch sensor can be suppressed. Furthermore, the formation of the parasitic capacitance might decrease the amplitude of a detection signal and decrease detection sensitivity. In one embodiment of the present invention, a detection signal is amplified and the amplified signal is output; thus, the adverse effect of the parasitic capacitance can be suppressed.

An active matrix touch sensor is used in the touch panel of one embodiment of the present invention, whereby the distance between the sensor portion and the display portion can be reduced in the touch panel, and the touch panel can have a small thickness. Furthermore, the touch sensor and the display element can be located between two substrates, whereby the touch panel can have a small thickness. Here, using the touch sensor of one embodiment of the present invention can suppress a decrease in the detection sensitivity of the touch sensor even when the distance between the sensor portion and the display portion is reduced. Therefore, in one embodiment of the present invention, both thickness reduction and high detection sensitivity of a touch sensor or a touch panel can be achieved. Furthermore, by using a flexible material for the pair of substrates of the touch panel, the touch panel can have flexibility. Furthermore, in one embodiment of the present invention, a touch panel with high resistance to repeated bending can be provided. Furthermore, a large-sized touch panel can be provided.

<Structure Example of Touch Panel>

FIGS. 1A to 1C are projection views illustrating components of a touch panel of one embodiment of the present invention. FIG. 1A is a projection view of a touch panel 500 of one embodiment of the present invention, and FIG. 1B is a projection view illustrating a structure of a sensor unit 10U included in the touch panel 500.

The touch panel 500 shown in FIG. 1A includes an input device 100 and a display portion 501.

The input device 100 has flexibility. The input device 100 includes a scan line G1, a signal line DL, a first base material 16, and a plurality of sensor units 10U. The sensor unit 10U shown in FIG. 1B is provided with window portions 14 that transmit visible light. The sensor units 10U are arranged in matrix. The scan line G1 is electrically connected to a plurality of sensor units 10U located in the row direction (indicated by the arrow R in the drawing). The signal line DL is electrically connected to a plurality of sensor units 10U located in the column direction (indicated by the arrow C in the drawing). The first base material 16 has flexibility. The first base material 16 supports the sensor unit 10U, the scan line G1, and the signal line DL. The touch sensor 100 may also include a driver circuit GD and a converter CONV. The sensor units 10U, the driver circuit GD, and the converter CONV can be configured using transistors formed in the same process.

The display portion 501 includes a second base material 510 and a plurality of pixels 502. The plurality of pixels 502 overlap with the window portions 14 and are arranged in matrix. The second base material 510 has flexibility. The second base material 510 supports the plurality of pixels 502 (FIG. 1C).

The sensor unit 10U includes a sensor element C1 overlapping with the window portions 14 and a sensor circuit 19 electrically connected to the sensor element C1 (FIG. 1B).

The sensor element C1 includes a first electrode 11 and a second electrode 12 that are the pair of electrodes.

A selection signal is supplied to the sensor circuit 19, and the sensor circuit 19 supplies a sensor signal DATA based on the change in the capacitance of the sensor element C1 or a parasitic capacitance of the sensor element C1.

The scan line G1 can supply the selection signal. The signal line DL can supply the sensor signal DATA. The sensor circuit 19 is located to overlap with gaps between the plurality of window portions 14.

In addition, the touch panel 500 described in this embodiment includes a coloring layer between the sensor unit 10U and the pixel 502 overlapping with the window portion 14 of the sensor unit 10U.

The touch panel 500 described in this embodiment includes the flexible input device 100 including the plurality of sensor units 10U, each of which is provided with the window portions 14 transmitting visible light, and the flexible display portion 501 including the plurality of pixels 502 overlapping with the window portions 14. The coloring layer is included between the window portion 14 and the pixel 502.

With such a structure, the touch panel can supply a sensor signal based on the change in the capacitance or the parasitic capacitance and positional information of the sensor unit supplying the sensor signal, can display image data relating to the positional information of the sensor unit, and can be bent. As a result, a novel touch panel with high convenience or high reliability can be provided.

The touch panel 500 may include a flexible substrate FPC1 to which a signal from the input device 100 is supplied and/or a flexible substrate FPC2 supplying a signal including image data to the display portion 501.

In addition, a protective layer 17p protecting the touch panel 500 by preventing damage and/or an anti-reflective layer 567p that weakens the intensity of external light reflected by the touch panel 500 may be included.

Moreover, the touch panel 500 includes a scan line driver circuit 503g which supplies the selection signal to a scan line of the display portion 501, a wiring 511 supplying a signal, and a terminal 519 electrically connected to the flexible substrate FPC2.

Components of the touch panel 500 are described below. Note that these components cannot be clearly distinguished and one component also serves as another component or includes part of another component in some cases.

For example, the input device 100 including the coloring layer overlapping with the plurality of window portions 14 also serves as a color filter.

Furthermore, for example, the touch panel 500 in which the input device 100 overlaps the display portion 501 serves as the input device 100 as well as the display portion 501.

The input device 100 includes the plurality of sensor units 10U and the flexible base material 16 supporting the sensor units. For example, the plurality of sensor units 10U is arranged in matrix with 40 rows and 15 columns on the flexible base material 16.

Specifically, the sensor units 10U each of which is 7.668 mm wide and 5.112 mm long can be arranged in matrix with 40 rows and 15 columns in a rectangular region that is 115.02 mm wide and 204.48 mm long.

The window portion 14 transmits visible light.

For example, the window portion 14 may be formed as follows: the base material 16, the sensor element C1, and a flexible protective base material 17 each formed using a material transmitting visible light or a material thin enough to transmit visible light overlap with each other so that transmission of visible light is not prevented.

For example, an opening portion may be provided in a material that does not transmit visible light. Specifically, one opening portion or a plurality of opening portions having any of a variety of shapes such as a rectangle may be provided.

A coloring layer that transmits light of a predetermined color is provided to overlap with the window portion 14. For example, a coloring layer CFB transmitting blue light, a coloring layer CFG transmitting green light, and a coloring layer CFR transmitting red light are included (FIG. 1B).

Note that, in addition to the coloring layers transmitting blue light, green light, and/or red light, coloring layers transmitting light of various colors such as a coloring layer transmitting white light and a coloring layer transmitting yellow light can be included.

For a coloring layer, a metal material, a resin material, a pigment, dye, or the like can be used.

A light-blocking layer BM is provided to surround the window portions 14. The light-blocking layer BM does not easily transmit light as compared to the window portion 14. Note that in an example illustrated in this specification and the like, a black matrix is used as the light-blocking layer, and the letter symbol BM is used to denote the light-blocking layer.

For the light-blocking layer BM, carbon black, a metal oxide, a composite oxide containing a solid solution of a plurality of metal oxides, or the like can be used.

The scan line G1, the signal line DL, a wiring VPI, a wiring RES, a wiring VRES, and the sensor circuit 19 are provided to overlap with the light-blocking layer BM.

Note that a light-transmitting overcoat covering the coloring layer and the light-blocking layer BM can be provided.

As the flexible base material 16 and the base material 510, an organic material, an inorganic material, or a composite material of an organic material and an inorganic material can be used.

For the base material 16 and the base material 510, a material with a thickness of 5 μm or more and 2500 μm or less, preferably 5 μm or more and 680 μm or less, further preferably 5 μm or more and 170 μm or less, further preferably 5 μm or more and 45 μm or less, further preferably 8 μm or more and 25 μm or less can be used.

A material with which unintended passage of impurities is inhibited can be favorably used for the base material 16 and the base material 510. For example, a material with a vapor permeability of lower than or equal to $10^{-5}$ g/(m²·day), preferably lower than or equal to $10^{-6}$ g/(m²·day) can be favorably used.

The base material 510 can be favorably formed using a material whose coefficient of linear expansion is substantially equal to that of the base material 16. For example, a material whose coefficient of linear expansion is preferably lower than or equal to $1\times10^{-3}$/K, further preferably lower than or equal to $5\times10^{-5}$/K, and still further preferably lower than or equal to $1\times10^{-5}$/K can be preferably used.

Examples of the base material 16 and the base material 510 are organic materials such as a resin, a resin film, and a plastic film.

Examples of the base material 16 and the base material 510 are inorganic materials such as a metal plate and a thin glass plate with a thickness of more than or equal to 10 μm and less than or equal to 50 μm.

An example of the base material 16 and the base material 510 is a composite material in which a metal plate, a thin glass plate, or a film of an inorganic material is bonded to a resin film or the like with a resin layer.

An example of the base material 16 and the base material 510 is a composite material in which a fibrous or particulate metal, glass, or an inorganic material is dispersed into resin or a resin film.

The resin layer can be formed using a thermosetting resin or an ultraviolet curable resin.

Specifically, a resin film or resin plate of polyester, polyolefin, polyamide, polyimide, polycarbonate, an acrylic resin, or the like can be used.

Specifically, non-alkali glass, soda-lime glass, potash glass, crystal glass, or the like can be used.

Specifically, a metal oxide film, a metal nitride film, a metal oxynitride film, or the like can be used. For example, a silicon oxide film, a silicon nitride film, a silicon oxynitride film, an alumina film, or the like can be used.

Specifically, SUS, aluminum, or the like in which an opening portion is provided can be used.

Specifically, an acrylic resin, a urethane resin, an epoxy resin, or a resin having a siloxane bond can be used.

For example, a stack in which a flexible substrate, an insulating film that prevents diffusion of impurities, and a bonding layer with which the flexible substrate and the insulating film are bonded to each other are stacked can be preferably used for the base material 16 and the base material 510.

Specifically, a stack of a 600-nm-thick silicon oxynitride film and a 200-nm-thick silicon nitride film may be included as the insulating film that prevents diffusion of impurities.

Alternatively, a stack of a 600-nm-thick silicon oxynitride film, a 200-nm-thick silicon nitride film, a 200-nm-thick silicon oxynitride film, a 140-nm-thick silicon nitride oxide film, and a 100-nm-thick silicon oxynitride film may be included as the insulating film that prevents diffusion of impurities.

A resin film or resin plate of polyester, polyolefin, polyamide, polyimide, polycarbonate, an acrylic resin, or the like, a stack of two or more of the above materials, or the like can be used for the flexible substrate.

For example, a material that includes polyester, polyolefin, polyamide (e.g., nylon, aramid), polyimide, polycarbonate, or a resin having an acrylic bond, a urethane bond, an epoxy bond, or a siloxane bond can be used for the adhesive layer.

A flexible protective base material 17 and/or the protective layer 17p can be provided. The flexible protective base material 17 or the protective layer 17p protects the input device 100 by preventing damage.

For example, a resin film or resin plate of polyester, polyolefin, polyamide, polyimide, polycarbonate, an acrylic resin, or the like, a stack of two or more of the above materials, or the like can be used for the protective base material 17.

For example, a hard coat layer or a ceramic coat layer can be used as the protective layer 17p. Specifically, a layer containing a ultraviolet curable resin or aluminum oxide may be formed.

The display portion 501 includes a plurality of pixels 502 arranged in matrix (FIG. 1C). For example, the pixel 502 includes a sub-pixel 502B, a sub-pixel 502G, and a sub-pixel 502R, and each sub-pixel includes a display element and a pixel circuit for driving the display element.

In a rectangular region that is 115.02 mm wide and 198.72 mm long, 1080 pixels in the horizontal direction and 1920 pixels in the vertical direction, each of which includes three sub-pixels (each sub-pixel is 35.5 µm wide and 106.5 µm long) may be arranged in matrix. Note that the rectangular region may be 9.2 inches diagonal, and the aperture ratio of the pixel may be 56.0%.

Note that in the pixel 502, the sub-pixel 502B is located to overlap with the coloring layer CFB, the sub-pixel 502G is located to overlap with the coloring layer CFG, and the sub-pixel 502R is located to overlap with the coloring layer CFR.

In this embodiment, an example of using an organic EL element that emits white light as a display element will be described; however, the display element is not limited to such an element.

For example, organic EL elements that emit light of different colors may be included in sub-pixels so that the light of different colors can be emitted from the respective sub-pixels.

Other than organic EL elements, any of various display elements such as display elements (electronic ink) that perform display by an electrophoretic method, an electronic liquid powder (registered trademark) method, an electrowetting method, or the like; MEMS shutter display elements; optical interference type MEMS display elements; and liquid crystal elements can be used.

Furthermore, this embodiment can be used in a transmissive liquid crystal display, a transflective liquid crystal display, a reflective liquid crystal display, a direct-view liquid crystal display, or the like. In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. A structure suitable for employed display elements can be selected from among a variety of structures of pixel circuits.

In the display portion, an active matrix method in which an active element (a non-linear element) is included in a pixel or a passive matrix method in which an active element is not included in a pixel can be used.

In the active matrix method, as an active element, not only a transistor but also a variety of active elements can be used. For example, an MIM (metal insulator metal), a TFD (thin film diode), or the like can also be used. Since such an element has few numbers of manufacturing steps, manufacturing cost can be reduced or yield can be improved. Alternatively, since the size of the element is small, the aperture ratio can be improved, so that power consumption can be reduced or higher luminance can be achieved.

Since an active element is not used in the passive matrix method, the number of manufacturing steps is small, so that manufacturing cost can be reduced or yield can be improved. Furthermore, since an active element is not used, the aperture ratio can be improved, so that power consumption can be reduced or higher luminance can be achieved, for example.

The display portion 501 may include the anti-reflective layer 567p positioned in a region overlapping with pixels. As the anti-reflective layer 567p, a circular polarizing plate can be used, for example.

The display portion 501 includes the wiring 511 through which a signal can be supplied. The wiring 511 is provided with the terminal 519. Note that the flexible substrate FPC2 through which a signal such as an image signal or a synchronization signal can be supplied is electrically connected to the terminal 519.

Note that a printed wiring board (PWB) may be attached to the flexible substrate FPC2.

<<Sensor Element C1>>

The sensor element C1 in this embodiment includes the first electrode 11 and the second electrode 12 that are a pair of electrodes. A dielectric layer is provided between the pair of electrodes.

The first electrode 11 is formed apart from other regions, for example, is formed into an island shape. A layer that can be formed in the same process as that of the first electrode 11 is preferably placed close to the first electrode 11 so that the user of the touch panel 500 does not recognize the first electrode 11. Further preferably, the number of the window portions 14 placed in the gap between the first electrode 11 and the layer placed close to the first electrode 11 is reduced as much as possible. In particular, the window portion 14 is preferably not placed in the gap.

The second electrode 12 is provided to overlap with the first electrode 11, and the dielectric layer is provided between the first electrode 11 and the second electrode 12.

For example, when an object whose dielectric constant is different from that of the air gets closer to one of the pair of electrodes of the sensor element C1 in the air, a capacitance is formed, and the formed capacitance is parasitic in a circuit. Specifically, when a finger or the like gets closer to the second electrode 12 of the sensor element C1, a capacitance is formed between the second electrode 12 and the finger or the like. Then, the formed capacitance is parasitic in a circuit that is electrically connected to the sensor element C1, and the operation of the sensor circuit is changed. Accordingly, the sensor element C1 can be used in a proximity sensor.

For example, the capacitance of the sensor element C1 that can be changed in shape is changed depending on the change in shape.

Specifically, when a finger or the like is in contact with the sensor element C1, and the gap between the pair of electrodes becomes small, the capacitance of the sensor element C1 is increased. Accordingly, the sensor element C1 can be used in a tactile sensor. As a result, for example, writing pressure can be sensed.

Specifically, when the sensor element C1 is bent, and the gap between the pair of electrodes becomes small, the capacitance of the sensor element C1 is increased. Accordingly, the sensor element C1 can be used in a bend sensor.

The pair of electrodes includes a conductive material.

For example, an inorganic conductive material, an organic conductive material, a metal material, a conductive ceramic material, or the like can be used for each of the pair of electrodes.

Specifically, a metal element selected from aluminum, chromium, copper, tantalum, titanium, molybdenum, tungsten, nickel, silver, and manganese; an alloy including any of the above-described metal elements; an alloy including any of the above-described metal elements in combination; or the like can be used.

Alternatively, a conductive oxide such as indium oxide, indium tin oxide, indium zinc oxide, zinc oxide, zinc oxide to which gallium is added, or the like can be used.

Alternatively, graphene or graphite can be used. The film including graphene can be formed, for example, by reducing a film containing graphene oxide. As a reducing method, a method with application of heat, a method using a reducing agent, or the like can be employed.

Alternatively, a conductive polymer can be used.

<<Sensor Circuit 19 and Converter CONV>>

FIGS. 2A, 2B1, 2B2, and 2C illustrate a configuration and a driving method of the sensor unit 10U and a converter CONV of one embodiment of the present invention.

FIG. 2A is a circuit diagram illustrating configurations of the sensor unit 10U and the converter CONV of one embodiment of the present invention, and FIGS. 2B1 and 2B2 are timing charts illustrating a driving method. FIG. 2C shows converters CONV that are different from the converter CONV shown in FIG. 2A.

The sensor circuit 19 in the sensor unit 10U includes transistors M1 to M3, for example (FIGS. 1A to 1C and FIG. 2A). In addition, the sensor circuit 19 includes wirings that supply a power supply potential and a signal. For example, the signal line DL, the wiring VPI, a wiring CS, the scan line G1, the wiring RES, the wiring VRES, and the like are included.

Note that the sensor circuit 19 may be located not to overlap with the window portion 14. For example, a wiring is located not to overlap with the window portion 14, whereby one side of the sensor unit 10U can be visually recognized easily from the other side of the sensor unit 10U.

Furthermore, the transistors M1 to M3 each include a semiconductor layer. For example, for the semiconductor layer, an element belonging to Group 4, a compound semiconductor, or an oxide semiconductor can be used. Specifically, a semiconductor containing silicon, a semiconductor containing gallium arsenide, an oxide semiconductor containing indium, or the like can be used.

Transistors that can be formed in the same process can be used as the transistors M1 to M3.

Any one of the transistors M1 to M3 preferably includes an oxide semiconductor layer. The off-state current of a transistor including an oxide semiconductor layer is small; therefore, it is particularly preferable that the transistor M1 include the oxide semiconductor layer.

For the wiring, a conductive material can be used.

For example, an inorganic conductive material, an organic conductive material, a metal material, a conductive ceramic material, or the like can be used for the wiring. Specifically, a material that is the same as those of the pair of electrodes of the sensor element can be used.

For the scan line G1, the signal line DL, the wiring VPI, the wiring RES, the wiring CS, and the wiring VRES, a metal material such as aluminum, gold, platinum, silver, nickel, titanium, tungsten, chromium, molybdenum, iron, cobalt, copper, or palladium, or an alloy material containing any of these metal materials can be used.

The sensor circuit 19 may be formed over the base material 16 by processing a film formed over the base material 16.

Alternatively, the sensor circuit 19 formed over another base material may be transferred to the base material 16.

Various circuits that can convert the sensor signal DATA supplied from the sensor unit 10U and supply the converted signal to the FPC1 can be used as a converter CONV (FIG. 1A). For example, a transistor M4 shown can be used in the converter CONV. Furthermore, as shown in FIG. 2C, the transistor M4 and a transistor M5 can be used in the converter CONV. A gate of the transistor M4 is electrically connected to a wiring VPOG. A first electrode of the transistor M5 is electrically connected to a wiring SF-GND.

The sensor circuit 19 of one embodiment of the present invention includes the transistor M1 whose gate is electrically connected to one electrode (here, the first electrode 11) of the sensor element C1 and whose first electrode is electrically connected to the wiring VPI (FIG. 2A). The wiring VPI can supply, for example, a ground potential.

Furthermore, the transistor M2 whose gate is electrically connected to the scan line G1, whose first electrode is electrically connected to a second electrode of the transistor M1, and whose second electrode is electrically connected to the signal line DL may be included. The scan line G1 can supply a selection signal. The signal line DL can supply, for example, the sensor signal DATA.

Furthermore, the transistor M3 whose gate is electrically connected to the wiring RES, whose first electrode is electrically connected to the one electrode (the first electrode 11 in FIG. 1B) of the sensor element C1, and whose second electrode is electrically connected to the wiring VRES may be included. The wiring RES can supply a reset signal. The wiring VRES can supply, for example, a potential at which the transistor M1 can be turned on.

The capacitance of the sensor element C1 is changed when an object gets closer to the first electrode 11 or the second electrode 12 or when a gap between the first electrode 11 and the second electrode 12 is changed, for example. Thus, the sensor unit 10U can supply the sensor signal DATA based on the change in the capacitance of the sensor element C1 or a parasitic capacitance of the sensor element C1.

Furthermore, the sensor unit 10U includes the wiring CS that can supply a control signal for controlling the potential of the other electrode (here, the second electrode 12) of the sensor element C1.

Note that a node at which the one electrode (here, the first electrode 11) of the sensor element C1, the gate of the transistor M1, and the first electrode of the transistor M3 are electrically connected to each other is referred to as a node A.

The wiring VRES can supply a predetermined potential. For example, a potential at which a transistor provided in the sensor unit 10U is turned on can be supplied to a gate of the transistor. The wiring VPI can supply a ground potential, for example, and the wiring VPO and the wiring BR each can supply a high power supply potential, for example. Furthermore, the wiring RES can supply the reset signal, and the scan line G1 can supply the selection signal. Furthermore, the signal line DL can supply the sensor signal DATA, and a terminal OUT can supply a signal converted based on the sensor signal DATA.

Any of various circuits that can convert the sensor signal DATA and supply the converted signal to the terminal OUT can be used as the converter CONV. For example, a source follower circuit, a current mirror circuit, or the like may be formed by the electrical connection between the converter CONV and the sensor circuit 19.

Specifically, by using the converter CONV including the transistor M4, a source follower circuit can be formed (FIG. 2A). Furthermore, as shown in FIG. 2C, the converter CONV may include the transistors M4 and M5. Note that transistors that can be formed in the same process as those of the transistor M1 to the transistor M3 may be used as the transistors M4 and M5.

As described above, in the active matrix touch sensor of one embodiment of the present invention, the electrode of the sensor element and the read wiring can be formed in different layers. As shown in FIG. 3A, the first electrode 11 that is the one electrode of the sensor element and the signal line DL are formed in different layers, and the width of the signal line DL is made narrow. Thus, the parasitic capacitance can be small. Accordingly, a decrease in the detection sensitivity of the touch sensor can be suppressed.

<Driving Method of Sensor Circuit 19>

A driving method of the sensor circuit 19 is described.

<<First Step>>

In a first step, a reset signal that turns on and then turns off the transistor M3 is supplied to the gate, and the potential of the first electrode 11 of the sensor element C1 is set to a predetermined potential (see a period T1 in FIG. 2B1).

Specifically, the reset signal is supplied from the wiring RES. The transistor M3 to which the reset signal is supplied sets the potential of the node A to a potential at which the transistor M1 is turned on, for example (FIG. 2A).

<<Second Step>>

In a second step, a selection signal that turns on the transistor M2 is supplied to the gate of the transistor M2, and the second electrode of the transistor M1 is electrically connected to the signal line DL.

Specifically, the selection signal is supplied from the scan line G1. Through the transistor M2 to which the selection signal is supplied, the second electrode of the transistor M1 is electrically connected to the signal line DL (see a period T2 in FIG. 2B1).

<<Third Step>>

In a third step, a control signal is supplied to the second electrode 12 of the sensor element C1, and a potential changed based on the control signal and the capacitance of the sensor element C1 is supplied to the gate of the transistor M1.

Specifically, a rectangular wave control signal is supplied from the wiring CS. The sensor element C1 in which the rectangular wave control signal is supplied to the second electrode 12 increases the potential of the node A on the basis of the capacitance of the sensor element C1 (see the latter half in the period T2 in FIG. 2B1).

For example, in the case where the sensor element is put in the air, when an object whose dielectric constant is higher than that of the air is located closer to the second electrode 12 of the sensor element C1, the capacitance of the sensor element C1 is apparently increased.

Thus, the change in the potential of the node A due to the rectangular wave control signal becomes smaller than that in the case where an object whose dielectric constant is higher than that of the air is not located closer (see a solid line in FIG. 2B2).

<<Fourth Step>>

In a fourth step, a signal obtained by the change in the potential of the gate of the transistor M1 is supplied to the signal line DL.

For example, a change in current due to the change in the potential of the gate of the transistor M1 is supplied to the signal line DL.

The converter CONV converts the change in the current flowing through the signal line DL into a change in voltage and outputs the voltage.

<<Fifth Step>>

In a fifth step, a selection signal for turning off the transistor M2 is supplied to the gate of the transistor M2.

<<Modification Example of Sensor Element C1>>

In the sensor element included in the touch panel of one embodiment of the present invention, one of the pair of electrodes can be common to the plurality of sensor elements; however, the other of the pair of electrodes needs to be independently provided in each of the sensor elements.

As illustrated in FIG. 1B and the like, the second electrode 12 is provided common to the plurality of sensor elements C1. Furthermore, as illustrated in FIG. 1B, FIG. 3A, and the like, one island-shaped first electrode 11 is provided in each sensor element C1.

Specifically, as illustrated in FIG. 3A, in a certain column, a first electrode 11(n) included in a sensor element in the n-th row and a first electrode 11(n+1) included in a sensor element in the (n+1)-th row are independently provided without overlapping with each other and having a point of contact (n is an integer of 1 or more). Note that, in a similar manner, in a certain row, the first electrodes 11 included in the sensor elements in the respective columns are independently provided.

Figure 3B:
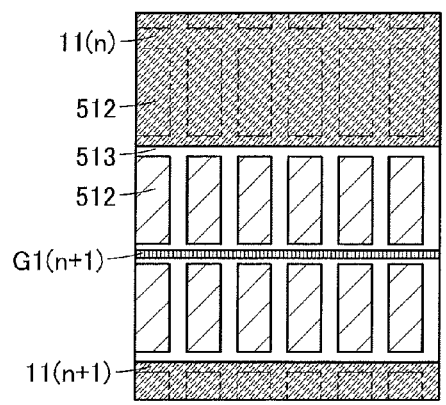

FIG. 3B is an enlarged view of a portion surrounded by a frame 55 in FIG. 3A. The first electrode 11(n) and the first electrode 11(n+1) are arranged with a scan line G1(n+1) provided therebetween. The first electrode 11(n) and the first electrode 11(n+1) are each overlapped with a plurality of sub-pixels 512.

Furthermore, when the first electrodes 11 are arranged so that the adjacent first electrodes 11 included in the sensor elements are not in contact with each other, some sub-pixels 512 do not overlap with the first electrode 11 in some cases as illustrated in FIG. 3B.

At this time, depending on a material that transmits visible light used in the island-shaped electrode, a region in which the island-shaped electrode is provided and a region in which the island-shaped electrode is not provided might have different transmittances. The sub-pixel 512 over which the island-shaped electrode is provided has luminance and chromaticity of display that are different from those of the sub-pixel 512 over which the island-shaped electrode is not provided, so that the display quality of the touch panel might decrease.

Then, in the touch panel of one embodiment of the present invention, it is preferable that the island-shaped electrode included in the sensor element not overlap with a pixel (or a sub-pixel).

Figure 3C:
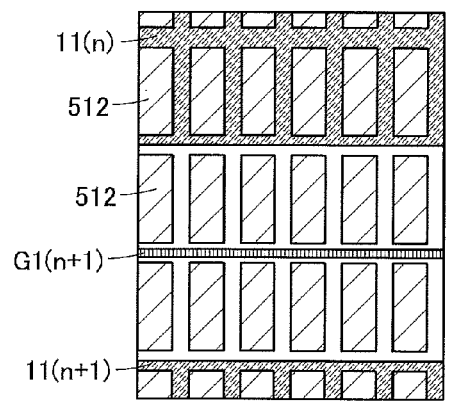

For example, as illustrated in FIG. 3C, the island-shaped first electrode 11 included in the sensor element may have an opening portion overlapping with the sub-pixel 512. Thus, each sub-pixel 512 does not overlap with the island-shaped first electrode 11, and the luminance and the chromaticity of display are not changed because of the pixel or the sub-pixel. Therefore, the decrease in display quality of the touch panel can be suppressed.

In other words, in the touch panel of one embodiment of the present invention, a display region of a display element or a light-emitting region of a light-emitting element in the pixel does not overlap with the island-shaped electrode. As the island-shaped electrode, any of electrodes that can be used for the sensor element and transmit visible light can be used.

In addition, there is no limitation on a display element and a light-emitting element. For example, an organic EL element including an EL layer between a pair of electrodes is used. At this time, an opening portion in an insulating film covering an end portion of one electrode preferably overlaps with the opening portion in the island-shaped electrode. In particular, it is preferable that a light-emitting region of the organic EL element or an opening portion in the insulating film not overlap with the island-shaped electrode.

Furthermore, in FIG. 3B, there are a region in which the first electrode 11 is provided and a region in which the first electrode 11 is not provided also in a region 513 between pixels arranged in matrix. When the two regions have different transmittances of visible light, in the touch panel, a pattern of the first electrodes arranged in matrix tends to be perceived.

Figure 4A:
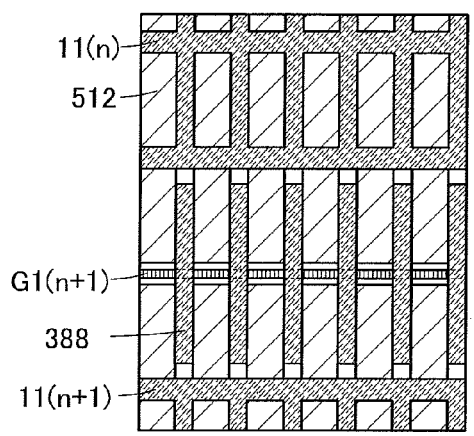
FIGS. 4A to 4C illustrate examples of a touch panel.
Figure 4B:
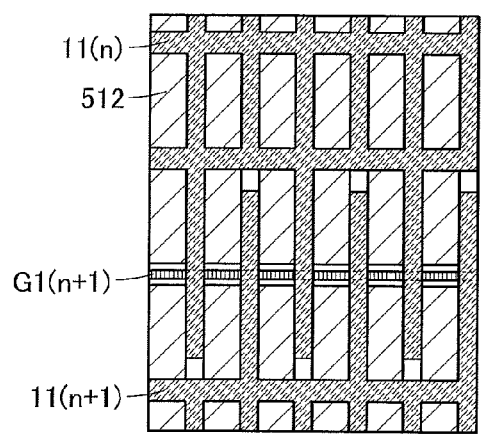
Figure 4C:
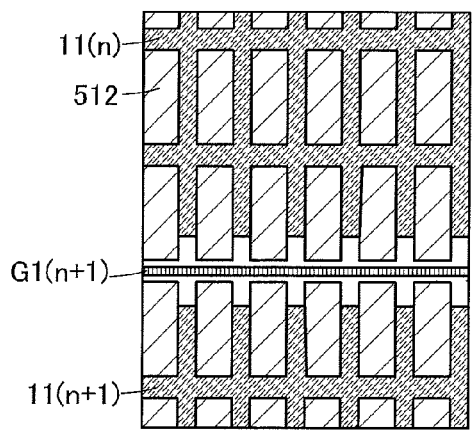

Thus, as in FIGS. 4A to 4C, it is preferable that a region in which the island-shaped first electrode is not provided be reduced as much as possible between the pixels. As a result, the pattern of the first electrodes arranged in matrix in the touch panel is not easily perceived, which is preferable.

As illustrated in FIG. 4A, a plurality of island-shaped first electrodes 388 whose potentials are floating may be provided between the first electrode 11(n) and the first electrode 11(n+1).

As illustrated in FIG. 4B, the comb-shaped first electrode 11(n) and the comb-shaped first electrode 11(n+1) may be provided.

Although the scan line G1(n+1) overlaps with the first electrode in FIGS. 4A and 4B, the scan line G1(n+1) does not need to overlap with the first electrode as in FIG. 4C. The layout of the first electrodes may be set depending on each wiring included in the touch sensor.

This embodiment can be combined with any other embodiment as appropriate.

(Embodiment 2)

In this embodiment, electronic devices and lighting devices that can be fabricated according to one embodiment of the present invention will be described with reference to FIGS. 5A to 5G and FIGS. 6A to 6I.

A touch panel of one embodiment of the present invention has flexibility. Therefore, a touch panel of one embodiment of the present invention can be used in electronic devices and lighting devices having flexibility. Furthermore, according to one embodiment of the present invention, electronic devices and lighting devices having high reliability and resistance against repeated bending can be manufactured.

Examples of electronic devices include a television set (also referred to as a television or a television receiver), a monitor of a computer or the like, a digital camera, a digital video camera, a digital photo frame, a mobile phone (also referred to as a mobile phone device), a portable game machine, a portable information terminal, an audio reproducing device, a large game machine such as a pinball machine, and the like.

The touch panel of one embodiment of the present invention has flexibility and therefore can be incorporated along a curved inside/outside wall surface of a house or a building or a curved interior/exterior surface of a car.

An electronic device of one embodiment of the present invention may include a touch panel and a secondary battery. It is preferable that the secondary battery is capable of being charged by contactless power transmission.

As examples of the secondary battery, a lithium ion secondary battery such as a lithium polymer battery (lithium ion polymer battery) using a gel electrolyte, a nickel-hydride battery, a nickel-cadmium battery, an organic radical battery, a lead-acid battery, an air secondary battery, a nickel-zinc battery, and a silver-zinc battery can be given.

The electronic device of one embodiment of the present invention may include a touch panel and an antenna. When a signal is received by the antenna, the electronic device can display an image, data, or the like on a display portion. When the electronic device includes a secondary battery, the antenna may be used for contactless power transmission.

Figure 5A:
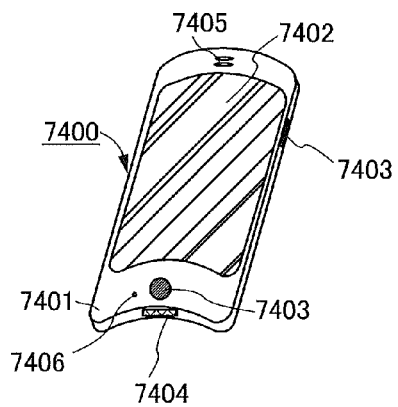
FIGS. 5A to 5G illustrate examples of electronic devices and lighting devices.

FIG. 5A illustrates an example of a mobile phone. The mobile phone 7400 is provided with a display portion 7402 incorporated in a housing 7401, operation buttons 7403, an external connection port 7404, a speaker 7405, a microphone 7406, and the like. Note that the mobile phone 7400 is manufactured by using the touch panel of one embodiment of the present invention for the display portion 7402. In accordance with one embodiment of the present invention, a highly reliable mobile phone having a curved display portion can be provided at a high yield.

When the display portion 7402 of the mobile phone 7400 illustrated in FIG. 5A is touched with a finger or the like, data can be input into the mobile phone 7400. Further, operations such as making a call and inputting a letter can be performed by touch on the display portion 7402 with a finger or the like.

With the operation buttons 7403, power ON or OFF can be switched. In addition, types of images displayed on the display portion 7402 can be switched; switching images from a mail creation screen to a main menu screen.

Figure 5B:
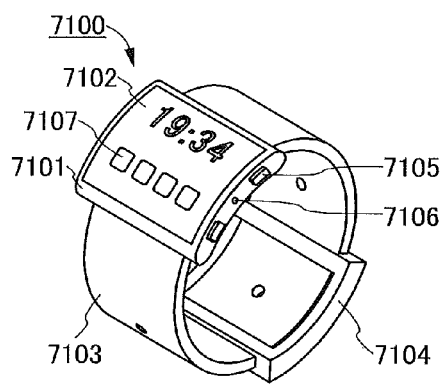

FIG. 5B illustrates an example of a wrist-watch-type portable information terminal. A portable information terminal 7100 includes a housing 7101, a display portion 7102, a band 7103, a buckle 7104, an operation button 7105, an input/output terminal 7106, and the like.

The portable information terminal 7100 is capable of executing a variety of applications such as mobile phone calls, e-mailing, reading and editing texts, music reproduction, Internet communication, and a computer game.

The display surface of the display portion 7102 is bent, and images can be displayed on the bent display surface. Furthermore, the display portion 7102 includes a touch sensor, and operation can be performed by touching the screen with a finger, a stylus, or the like. For example, by touching an icon 7107 displayed on the display portion 7102, an application can be started.

With the operation button 7105, a variety of functions such as time setting, power ON/OFF, ON/OFF of wireless communication, setting and cancellation of manner mode, and setting and cancellation of power saving mode can be performed. For example, the functions of the operation button 7105 can be set freely by setting the operating system incorporated in the portable information terminal 7100.

The portable information terminal 7100 can employ near field communication that is a communication method based on an existing communication standard. In that case, for example, mutual communication between the portable information terminal 7100 and a headset capable of wireless communication can be performed, and thus hands-free calling is possible.

Moreover, the portable information terminal 7100 includes the input/output terminal 7106, and data can be directly transmitted to and received from another information terminal via a connector. Charging through the input/output terminal 7106 is possible. Note that the charging operation may be performed by wireless power feeding without using the input/output terminal 7106.

The display portion 7102 of the portable information terminal 7100 includes the touch panel of one embodiment of the present invention. According to one embodiment of the present invention, a highly reliable portable information terminal having a curved display portion can be provided with a high yield.

Figure 5C:
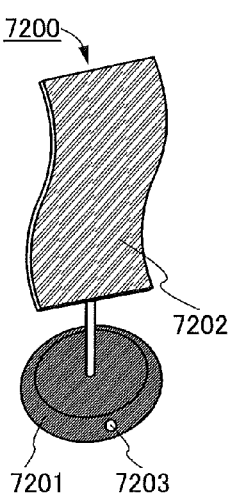
Figure 5D:
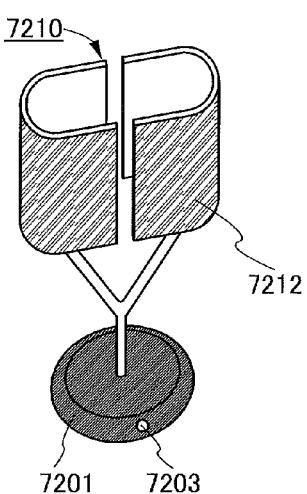
Figure 5E:
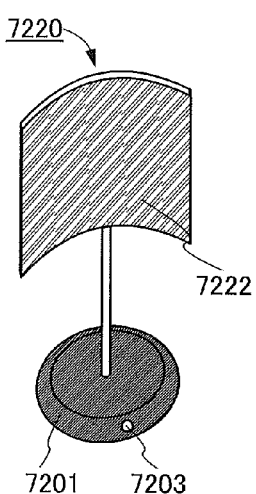

FIGS. 5C to 5E illustrate examples of a lighting device. Lighting devices 7200, 7210, and 7220 each include a stage 7201 provided with an operation switch 7203 and a light-emitting portion supported by the stage 7201.

The lighting device 7200 illustrated in FIG. 5C includes a light-emitting portion 7202 having a wave-shaped light-emitting surface, and thus has good design.

A light-emitting portion 7212 included in the lighting device 7210 illustrated in FIG. 5D has two convex-curved light-emitting portions symmetrically placed. Thus, all directions can be illuminated with the lighting device 7210 as a center.

The lighting device 7220 illustrated in FIG. 5E includes a concave-curved light-emitting portion 7222. This is suitable for illuminating a specific range because light emitted from the light-emitting portion 7222 is collected to the front of the lighting device 7220.

The light-emitting portion included in each of the lighting devices 7200, 7210, and 7220 are flexible; thus, the light-emitting portion may be fixed on a plastic member, a movable frame, or the like so that an emission surface of the light-emitting portion can be bent freely depending on the intended use.

Note that although the lighting device in which the light-emitting portion is supported by the stage is described as an example here, a housing provided with a light-emitting portion can be fixed on a ceiling or suspended from a ceiling. Since the light-emitting surface can be curved, the light-emitting surface is curved to have a depressed shape, whereby a particular region can be brightly illuminated, or the light-emitting surface is curved to have a projecting shape, whereby a whole room can be brightly illuminated.

Here, the light-emitting portions each include the touch panel of one embodiment of the present invention. In accordance with one embodiment of the present invention, a highly reliable lighting device having a curved light-emitting portion can be provided at a high yield.

Figure 5F:
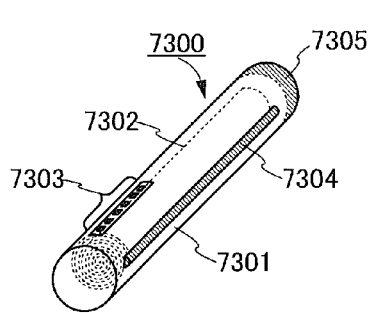

FIG. 5F illustrates an example of a portable touch panel. A touch panel 7300 includes a housing 7301, a display portion 7302, operation buttons 7303, a display portion pull 7304, and a control portion 7305.

The touch panel 7300 includes a rolled flexible display portion 7302 in the cylindrical housing 7301.

The touch panel 7300 can receive a video signal with the control portion 7305 and can display the received video on the display portion 7302. In addition, a battery is included in the control portion 7305. Moreover, a terminal portion for connecting a connector may be included in the control portion 7305 so that a video signal or power can be directly supplied from the outside with a wiring.

By pressing the operation buttons 7303, power ON/OFF, switching of displayed videos, and the like can be performed.

Figure 5G:
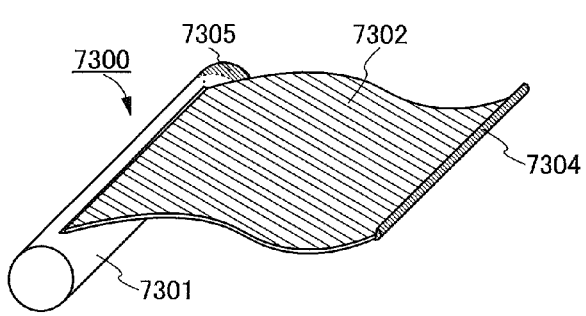

FIG. 5G illustrates a touch panel 7300 in a state where the display portion 7302 is pulled out with the display portion pull 7304. Videos can be displayed on the display portion 7302 in this state. Further, the operation buttons 7303 on the surface of the housing 7301 allow one-handed operation. The operation buttons 7303 are provided not in the center of the housing 7301 but on one side of the housing 7301 as illustrated in FIG. 5F, which makes one-handed operation easy.

Note that a reinforcement frame may be provided for a side portion of the display portion 7302 so that the display portion 7302 has a flat display surface when pulled out.

Note that in addition to this structure, a speaker may be provided for the housing so that sound is output with an audio signal received together with a video signal.

The display portion 7302 includes the touch panel of one embodiment of the present invention. According to one embodiment of the present invention, a lightweight and highly reliable touch panel can be provided with a high yield.

Figure 6A:
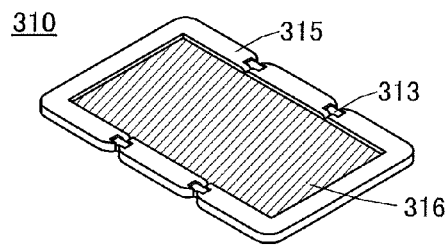
FIGS. 6A to 6I illustrate examples of electronic devices.
Figure 6F:
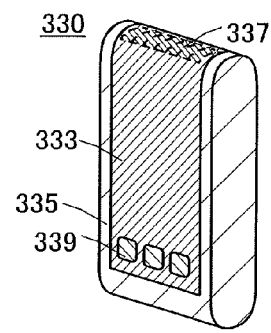
Figure 6B:
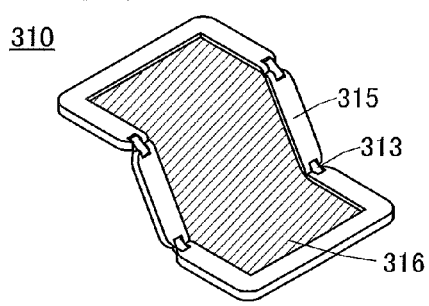
Figure 6G:
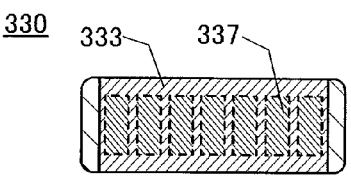
Figure 6C:
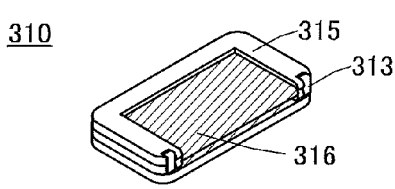

FIGS. 6A to 6C illustrate a foldable portable information terminal 310. FIG. 6A illustrates the portable information terminal 310 that is opened. FIG. 6B illustrates the portable information terminal 310 that is being opened or being folded. FIG. 6C illustrates the portable information terminal 310 that is folded. The portable information terminal 310 is highly portable when folded. When the portable information terminal 310 is opened, a seamless large display region is highly browsable.

A display panel 316 is supported by three housings 315 joined together by hinges 313. By folding the portable information terminal 310 at a connection portion between two housings 315 with the hinges 313, the portable information terminal 310 can be reversibly changed in shape from an opened state to a folded state. The touch panel according to one embodiment of the present invention can be used for the display panel 316. For example, a touch panel that can be bent with a radius of curvature of greater than or equal to 1 mm and less than or equal to 150 mm can be used.

Note that in one embodiment of the present invention, a sensor that senses whether the touch panel is in a folded state or an unfolded state and supplies sensing data may be used. The operation of a folded portion (or a portion that becomes invisible by a user by folding) of the touch panel may be stopped by a control device through the acquisition of data indicating the folded state of the touch panel. Specifically, display of the portion may be stopped, and furthermore, sensing by the touch sensor may be stopped.

Similarly, the control device of the touch panel may acquire data indicating the unfolded state of the touch panel to resume displaying and sensing by the touch sensor.

Figure 6H:
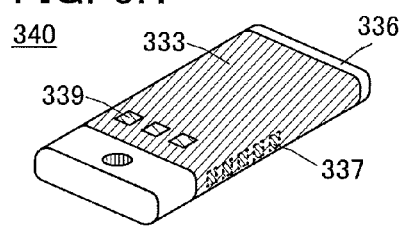
Figure 6D:
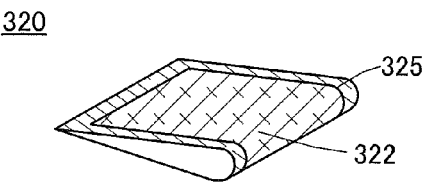
Figure 6I:
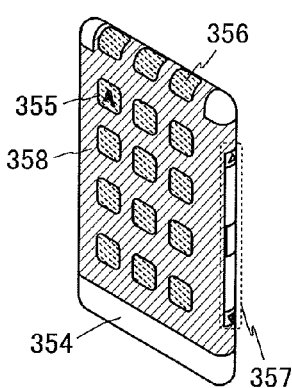
Figure 6E:
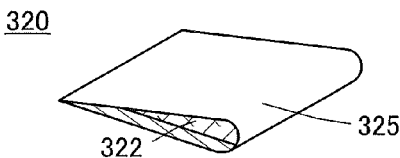

FIGS. 6D and 6E each illustrate a foldable portable information terminal 320. FIG. 6D illustrates the portable information terminal 320 that is folded so that a display portion 322 is on the outside. FIG. 6E illustrates the portable information terminal 320 that is folded so that the display portion 322 is on the inside. When the portable information terminal 320 is not used, the portable information terminal 320 is folded so that a non-display portion 325 faces the outside, whereby the display portion 322 can be prevented from being contaminated or damaged. The touch panel in one embodiment of the present invention can be used for the display portion 322.

FIG. 6F is a perspective view illustrating an external shape of the portable information terminal 330. FIG. 6G is a top view of the portable information terminal 330. FIG. 6H is a perspective view illustrating an external shape of a portable information terminal 340.

The portable information terminals 330 and 340 each function as, for example, one or more of a telephone set, a notebook, and an information browsing system. Specifically, the portable information terminals 330 and 340 each can be used as a smartphone.

The portable information terminals 330 and 340 can display characters and image information on its plurality of surfaces. For example, three operation buttons 339 can be displayed on one surface (FIGS. 6F and 6H). In addition, information 337 indicated by dashed rectangles can be displayed on another surface (FIGS. 6G and 6H). Examples of the information 337 include notification from a social networking service (SNS), display indicating reception of an e-mail or an incoming call, the title or the sender of an e-mail or the like, the date, the time, remaining battery, and the reception strength of an antenna. Alternatively, the operation buttons 339, an icon, or the like may be displayed in place of the information 337. Although FIGS. 6F and 6G illustrate an example in which the information 337 is displayed at the top, one embodiment of the present invention is not limited thereto. The information may be displayed, for example, on the side as in the portable information terminal 340 illustrated in FIG. 6H.

For example, a user of the portable information terminal 330 can see the display (here, the information 337) with the portable information terminal 330 put in a breast pocket of his/her clothes.

Specifically, a caller's phone number, name, or the like of an incoming call is displayed in a position that can be seen from above the portable information terminal 330. Thus, the user can see the display without taking out the portable information terminal 330 from the pocket and decide whether to answer the call.

A touch panel of one embodiment of the present invention can be used for a display portion 333 mounted in each of a housing 335 of the portable information terminal 330 and a housing 336 of the portable information terminal 340. According to one embodiment of the present invention, a highly reliable touch panel having a curved display portion can be provided with a high yield.

As in a portable information terminal 345 illustrated in FIG. 6I, data may be displayed on three or more surfaces. Here, data 355, data 356, and data 357 are displayed on different surfaces.

The touch panel of one embodiment of the present invention can be used for a display portion 358 included in a housing 354 of the portable information terminal 345. According to one embodiment of the present invention, a highly reliable touch panel having a curved display portion can be provided with a high yield.

This embodiment can be combined with any other embodiment as appropriate.

This application is based on Japanese Patent Application serial no. 2014-050690 filed with Japan Patent Office on Mar. 13, 2014, the entire contents of which are hereby incorporated by reference.

What is claimed is:

1. A touch panel comprising:
   a touch sensor; and
   a display element,
   wherein the touch sensor includes a transistor and a sensor element,
   wherein the transistor and the sensor element are electrically connected to each other,
   wherein the sensor element includes a pair of electrodes and a dielectric layer,
   wherein the dielectric layer is between the pair of electrodes,
   wherein one of the pair of electrodes is an island-shaped electrode comprising an opening portion,
   wherein the one of the pair of electrodes comprises a transparent conductive material, and
   wherein the display element can display an image toward a touch sensor side, and
   wherein the island-shaped electrode does not overlap with a display region of the display element.

2. The touch panel according to claim 1, wherein the touch panel has flexibility.

3. The touch panel according to claim 1, wherein the transistor in the touch sensor comprises an oxide semiconductor layer.

4. The touch panel according to claim 1,
   wherein the touch panel further includes a light-blocking layer that is positioned between the touch sensor and the display element, and
   wherein the light-blocking layer has a portion overlapping with the transistor included in the touch sensor.

5. The touch panel according to claim 4, wherein the light-blocking layer includes carbon black, a metal oxide, or a composite oxide containing a solid solution of a plurality of metal oxides.

6. The touch panel according to claim 1,
   wherein the display element includes a first electrode, a second electrode, and a layer including a light-emitting organic compound, and
   wherein the layer including the light-emitting organic compound is between the first electrode and the second electrode.

7. The touch panel according to claim 6,
   wherein the touch panel further comprises an insulating film, and
   wherein the insulating film covers an end portion of the first electrode and includes a portion overlapping with the transistor included in the touch sensor.

8. A touch panel comprising:
   a touch sensor;
   a display element; and
   wherein the touch sensor includes a transistor and a sensor element,
   wherein the transistor and the sensor element are electrically connected to each other,
   wherein the sensor element includes a pair of electrodes and a dielectric layer,
   wherein the dielectric layer is between the pair of electrodes,
   wherein one of the pair of electrodes is an island-shaped electrode comprising an opening portion,
   wherein the display element can display an image toward a touch sensor side, and wherein the opening portion of the island-shaped electrode overlaps with a display region of the display element.

9. The touch panel according to claim 8, wherein the touch panel has flexibility.

10. The touch panel according to claim 8, wherein the transistor in the touch sensor comprises an oxide semiconductor layer.

11. The touch panel according to claim 8, wherein an electrode layer in the touch sensor and an electrode layer in the transistor exist in the same layer.

12. The touch panel according to claim 8,
wherein the touch panel further includes a light-blocking layer that is positioned between the touch sensor and the display element, and
wherein the light-blocking layer has a portion overlapping with the transistor included in the touch sensor.

13. The touch panel according to claim 12, wherein the light-blocking layer includes carbon black, a metal oxide, or a composite oxide containing a solid solution of a plurality of metal oxides.

14. The touch panel according to claim 8,
wherein the display element includes a first electrode, a second electrode, and a layer including a light-emitting organic compound, and
wherein the layer including the light-emitting organic compound is between the first electrode and the second electrode.

15. The touch panel according to claim 14,
wherein the touch panel further comprises an insulating film, and
wherein the insulating film covers an end portion of the first electrode and includes a portion overlapping with the transistor included in the touch sensor.

16. The touch panel according to claim 15,
wherein the opening portion of the island-shaped electrode overlaps with an opening portion of the insulating film.

17. A touch panel comprising:
a plurality of first electrodes arranged in a matrix, each including a plurality of openings;
a second electrode opposed to the plurality of first electrodes, wherein the second electrode continuously overlaps with the plurality of first electrodes; and
a transistor electrically connected to one of the plurality of first electrodes,
wherein the one of the plurality of first electrodes and the second electrode form a capacitor of a touch sensor.

18. The touch panel according to claim 17,
wherein the plurality of openings are configured to allow light to pass through the plurality of openings from a light emitting layer.

* * * * *